(12) United States Patent
Matousek et al.

(10) Patent No.: US 9,607,632 B1
(45) Date of Patent: Mar. 28, 2017

(54) MULTIPLE VIRTUAL PREAMPS IN A SINGLE DIE

(71) Applicant: Seagate Technology LLC, Cupertino, CA (US)

(72) Inventors: Robert Matousek, Berthoud, CO (US); Thomas Lee Schick, Arvada, CO (US); Jon David Trantham, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/044,726

(22) Filed: Feb. 16, 2016

(51) Int. Cl.
G11B 5/09 (2006.01)

(52) U.S. Cl.
CPC .................................... *G11B 5/09* (2013.01)

(58) Field of Classification Search
None
See application file for complete search history.

(56) References Cited

U.S. PATENT DOCUMENTS

| | | | | |
|---|---|---|---|---|
| 4,340,932 | A * | 7/1982 | Bakula | G06F 12/0623 711/2 |
| 5,610,808 | A * | 3/1997 | Squires | G06F 3/0601 360/78.12 |
| 5,805,386 | A | 9/1998 | Faris | |
| 5,978,162 | A * | 11/1999 | Behrens | G11B 5/012 360/46 |
| 6,519,109 | B1 * | 2/2003 | Price | G11B 5/59605 360/78.09 |
| 6,968,404 | B2 * | 11/2005 | Verinsky | G06F 3/0601 710/2 |
| 7,787,206 | B2 | 8/2010 | Yen | |
| 8,570,681 | B2 | 10/2013 | Ho | |
| 2002/0030916 | A1 * | 3/2002 | Patti | G11B 5/012 360/66 |
| 2002/0095536 | A1 | 7/2002 | Emberty | |
| 2004/0034724 | A1 * | 2/2004 | Bruner | G06F 3/0658 710/8 |
| 2006/0066972 | A1 | 3/2006 | Martin | |
| 2014/0047293 | A1 * | 2/2014 | Lamb | G01R 31/318555 714/727 |
| 2014/0104716 | A1 * | 4/2014 | Wilson | G11B 5/09 360/46 |

FOREIGN PATENT DOCUMENTS

WO WO2015016782 2/2015

* cited by examiner

*Primary Examiner* — Peter Vincent Agustin
(74) *Attorney, Agent, or Firm* — Taylor English Duma LLP (57) ABSTRACT

Methods, apparatuses, and systems for allowing a single-die preamp to act as two or more virtual preamps for reading or writing data through multiple heads or elements concurrently. A selection register of a preamplifier is set to enable access to a primary register map. Values of registers in the primary register map are set to program a primary preamp channel for performing read or write operations to a first head. The selection register is then set to enable access to a secondary register map, and values of registers in the secondary register map are set to program a secondary preamp channel for performing read or write operations to a second head. Read or write operations can be performed to the first head through the primary preamp channel at a same time that read or write operations are performed to the second head through the second preamp channel.

20 Claims, 7 Drawing Sheets

MULTIPLE VIRTUAL PREAMPS IN A SINGLE DIE

BRIEF SUMMARY

The present disclosure relates to methods, apparatuses, and systems for allowing a single-die preamp to act as two or more virtual preamps for reading or writing data through multiple heads or elements concurrently. According to some embodiments, a method comprises setting a selection register of a preamplifier in a storage device to enable access to a primary register map of the preamplifier. Values of registers in the primary register map are set to program a primary preamp channel for performing read or write operations to a first reader or writer element in the storage device. The selection register is then set to enable access to a secondary register map of the preamplifier, and values of registers in the secondary register map are set to program a secondary preamp channel for performing read or write operations to a second reader or writer element in the storage device. Finally, read or write operations can be performed to the first reader or writer element through the primary preamp channel at a same time that read or write operations are performed to the second reader or writer element through the second preamp channel.

According to further embodiments, a preamplifier apparatus for a storage device is connected to a plurality of read/write heads of the storage device. The preamplifier apparatus comprises a primary register map and at least one secondary register map and is configured to control read or write operations of a first of the plurality of read/write heads based on a contents of the primary register map while concurrently controlling read or write operations of a second of the plurality of read/write heads based on the contents of the at least one secondary register map.

According to further embodiments, a processor in a hard-disk drive ("HDD") enables a virtual preamp feature in a preamplifier in the HDD device by writing registers within the preamplifier over a serial interface. The processor then sets a secondary register map selection register of the preamplifier to address a primary register map of the preamplifier, and sets a head selection register of the primary register map to select a first read/write head of the HDD device for read or write operations through a primary preamp channel of the preamplifier. The processor then sets registers in the primary register map to program the primary preamp channel for the first read/write head.

Next, the processor sets the secondary register map selection register to address a secondary register map of the preamplifier and sets a head selection register of the secondary register map to select a second read/write head of the HDD device for read or write operations through a secondary preamp channel of the preamplifier. The processor then sets registers in the secondary register map to program the secondary preamp channel for the second read/write head. The processor may then perform read or write operations to the first read/write head through the primary preamp channel while concurrently performing read or write operations to the second read/write head through the second preamp channel.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following detailed description is directed to methods, apparatuses, and systems for allowing a single-die preamp in a storage device, such as a hard disk drive ("HDD"), to act as two or more independent virtual preamps for reading or writing data through multiple heads or elements concurrently. In a typical HDD, a preamplifier (also referred to herein as a "preamp") is implemented separately from the controller or system-on-chip ("SoC") and located as close to the read/write heads as possible in order to eliminate noise in the analog recording signals. An HDD device may incorporate a single preamp component that limits the controller to reading from or writing to only one read/write head of the device at a time. In some HDD devices, multiple preamps components may be implemented that allow a controller with multiple read/write channels to read from or write to multiple heads concurrently. For example, distinct preamp circuits may be fabricated on separate dies and packaged in a single package or multiple, separate packages. The controller may address the preamp circuits independently to configure and control the preamp processing prior to any concurrent read or write commands.

According to embodiments described herein, a single preamp component may be implemented in an HDD or other storage device that supports concurrent read or write operations to separate read/write heads or elements within the device. The preamp component may be implemented on a single die and configured to act as two or more preamps for multiple, concurrent operation. For example, a single-die preamp component may be implemented in a storage device that allows a controller of the device to program and activate two, independent preamp channels to support operations to two different read/write heads or different elements on the same head at one time, either with both heads reading at once, both heads writing at once, or with one head reading while the other head is writing. This is accomplished by implementing additional (secondary, tertiary, etc.) virtual register maps in addition to the conventional primary or main register map for each additional preamp channel on the die. Each register map controls a different preamp channel to drive the separate read/write heads, thus creating a virtual, second preamp within the same preamp die.

The preamp further implements controls which allow the controller to address both the primary and secondary register maps in order to program the separate preamp channels independently. The preamp may contain a selection register that indicates which preamp channel and associated head/element will be responsive to serial interface ("SIF") commands from the controller of the storage device. For example, in normal operation, the preamp receives and responds to the SIF commands from the primary register map. However, if a special register bit is set, referred to herein as the secondary register map selection ("SRMS") bit, then the SIF commands will affect a secondary (virtual) register map which allows the programming and operation of the second preamp channel independently from the first primary preamp channel.

The preamp may further contain controls that allow this virtual preamp feature to be enabled or disabled, depending on the needs of the controller. For example, the preamp may implement two, non-co-located control bits that must be set to high (=1) to enable the feature. When operational, two (or more) different preamp channels may be in active mode and reading and/or writing data to individual recording surfaces of the storage device drive through different heads. In some embodiments, the preamp may be configured to allow operations from different elements of the same head concurrently. For example, multiple reader elements on a single head may be read concurrently through different preamp channels.

Figure 1:
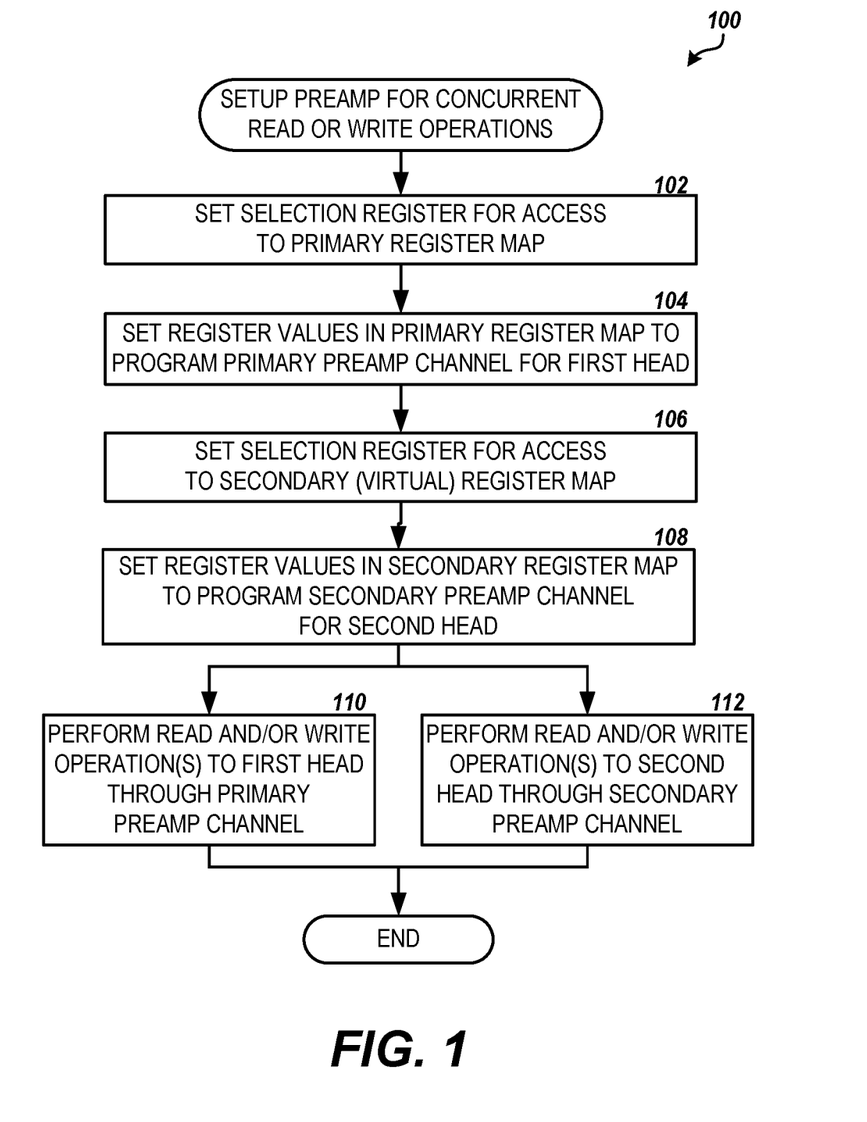
FIG. 1 is a flow diagram showing one method for allowing a single-die preamp to act as two or more virtual preamps for reading or writing data through multiple heads or elements concurrently, according to embodiments described herein.

FIG. 1 shows one routine 100 that a controller of a storage device may use to setup the preamp described herein for performing concurrent read and write operations to different head/element combinations, according to some embodiments. The routine 100 includes step 102, where the controller sets the selection register of the preamp to indicate access to the primary register map is desired. For example, the controller may issue a SIF command to clear the SRMS bit (=0) described above. The routine 100 then proceeds from step 102 to step 104, where the controller sets the register values in the primary register map to program the primary preamp channel for reading and/or writing to the first head/element combination. For example, the controller may set a head selection register value in the primary register map to indicate the first read/write head or a specific element on the head to which to route the signals from the primary preamp channel, as well as set operational parameters for the preamp channel that are specific to the first read/write head, such as write current, heater power, MR bias current, and the like.

From step 104, the routine 100 proceeds to step 106, where the controller sets the selection register of the preamp to indicate access to the secondary (virtual) register map is desired. For example, the controller may issue a SIF command to set the SRMS bit (=1). The routine 100 proceeds from step 106 to step 108, where the controller sets the register values in the secondary register map to program the secondary preamp channel for reading and/or writing to the second head/element combination, in a manner similar to that described above in regard to step 104.

Once both the primary preamp channel and the secondary preamp channel are programmed for operations to the respective head/element combinations, the routine 100 proceeds to step 110, where the controller can perform the desired read or write operations to the first read/write head through the primary preamp channel, while at the same time performing the desired read or write operations to the second read/write head through the secondary preamp channel, as shown at step 112. According to some embodiments, the preamp may further implement controls that allow independent write-enable control of the two preamp channels, thus allowing the controller to read from one head/element combination while concurrently writing to the other. Once the read and/or write operations targeting the first read/write head and the second read/write head are complete through the respective, configured preamp channels, the routine 100 ends.

Figure 2:
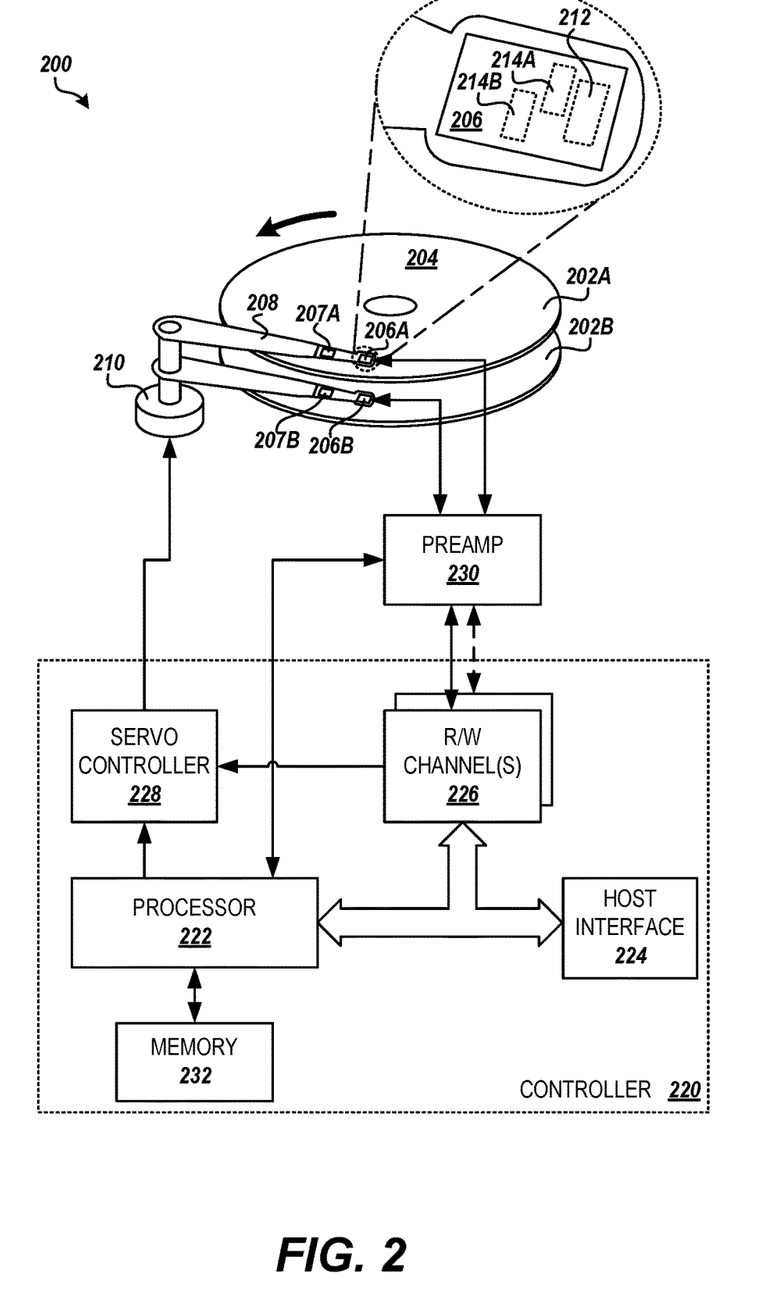
FIG. 2 is a block diagram showing an illustrative storage device in which the embodiments described herein may be utilized.

FIG. 2 and the following description are intended to provide a general description of a suitable environment in which the embodiments described herein may be implemented. In particular, FIG. 2 shows an illustrative storage device 200, such as an HDD device, along with hardware, software and components for allowing a single-die preamp to act as two or more virtual preamps for reading or writing data through multiple heads or elements concurrently, according to the embodiments provided herein. The storage device 200 may include rotational storage media comprising one or more platters or disks, such as disks 202A and 202B (referred to herein generally as disks 202) rotatable by a spindle motor, with each disk having at least one magnetic recording surface 204 or coating.

The storage device 200 further includes at least one read/write head located adjacent to each recording surface 204, such as heads 206A and 206B shown in the figure (referred to herein generally as read/write head 206). The read/write heads 206 may read information from the associated recording surface 204 by sensing a magnetic field formed on portions of the surface, and may write information to the associated recording surface by magnetizing a portion of the surface. The read/write heads 206 may be located at the distal end of an arm 208, the arm being further connected to an actuator 210, such as a voice coil motor ("VCM"), that repositions the read/write heads 206. Piezoelectric micro-actuators, such as micro-actuators 207A and 207B, may further adjust the fine positioning of individual read/write heads 206.

Each read/write head 206 may comprise at least one magnetic writer element 212. In addition, the read/write heads 206 may contain one or more reader elements, such as reader elements 214A and 214B (referred to herein generally as reader elements 214). The reader elements 214 may comprise magneto-resistive ("MR") readers, tunneling MR readers, or the like. It will be appreciated by one of ordinary skill in the art that each read/write head 206 may comprise additional components, including optical heating elements, additional micro-actuators, dynamic flying height heaters, sensors, sliders, and the like.

The storage device 200 may further comprise a controller 220 that controls the operations of the storage device. The controller 220 may include one or more processors, such as processor 222, to monitor and control the operations of the storage device 200. The controller may further include a host interface 224 allowing the storage device 200 to communicate with a host device or other components, such as a server computer, personal computer ("PC"), laptop, tablet, game console, set-top box or any other electronics device that can be communicatively coupled to the storage device 200 to store and retrieve data from the storage device. The controller 220 may process write commands from the host device by formatting the associated data and transfer the formatted data via a read/write channel 226 through the read/write head 206 and to a target location on the recording surface of the disk 202. The controller 220 may further process read commands from the host device by determining the target location on the recording surface containing the desired data, moving the read/write head(s) 206 over the determined location, reading the data from the recording surface via the read/write channel 226, correcting any errors and formatting the data for transfer to the host device.

The read/write channel 226 may convert data between the digital signals received by the host interface 224 and/or processed by the processor 222 and the analog signals conducted through the read/write heads 206 for reading and writing data to the recording surface of the disks 202. The read/write channel 226 may further provide servo data read from the disk 202 to a servo controller 228 that drives the actuator 210 and micro-actuators 207A, 207B to position the read/write head 206. The read/write heads 206 may be positioned to read or write data to the target locations on the recording surface of the disks 202 by moving the read/write heads 206 radially across the disks using the actuator 210 while the spindle motor rotates the disk to bring the target location under the read/write head. According to some embodiments, the controller 220 may implement multiple read/write channels 226 that allow processing of signals to or from two or more read/write heads 206 or elements 212, 214 simultaneously.

The analog signals to and from the read/write heads 206 may be further processed through a preamplifier 230. The preamplifier 230 conditions and distributes the analog signals from the read/write channel(s) 226 to the various read/write heads 206 and allows configuration and control of other elements on the read/write heads, such as flying-height heaters, optical heating elements, and the like. The preamplifier 230 may be located in close proximity to the read/write heads 206, such as attached to the actuator arm 208. According to embodiments, the processor 222 may send control signals to the preamplifier 230 to program the preamp for various operations targeting different read/write heads 206 and/or elements 212, 214, and may further receive fault information from the preamplifier indicating write faults or other anomalies in the preamp or heads.

The controller 220 may further include a computer-readable storage medium or "memory" 232 for storing processor-executable instructions, data structures, and other information. The memory 232 may comprise a non-volatile memory, such as read-only memory ("ROM") and/or FLASH memory, and a random-access memory ("RAM"), such as dynamic random access memory ("DRAM") or static random access memory ("SRAM"). The memory 232 may further comprise a portion of the storage media of the storage device 200, such as the maintenance cylinder ("M/C") of the disk 202. For example, the memory 232 may store a firmware that comprises commands and data necessary for performing the operations of the storage device 200. According to some embodiments, the memory 232 may comprise processor-executable instructions for performing the routines 100, 500, and 600 described herein for setting up a single-die preamp described herein for concurrent read or write operations to separate head/elements as described herein.

In addition to the memory 232, the environment may include other computer-readable media storing program modules, data structures and other data described herein. It will be appreciated by those skilled in the art that computer-readable media can be any available media that may be accessed by the controller 220 or other computing system, including computer-readable storage media and communications media. Communications media includes transitory signals. Computer-readable storage media includes volatile and non-volatile, removable and non-removable storage media implemented in any method or technology for the non-transitory storage of information. For example, computer-readable storage media includes, but is not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

It will be appreciated that the structure of the storage device 200 may be different that that illustrated in FIG. 2 and described herein. For example, the processor 222, read/write channel(s) 226, memory 232, and other components and circuitry of the storage device 200 may be integrated within a common integrated circuit package, such as a system-on-chip ("SoC"), or they may be distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 3:
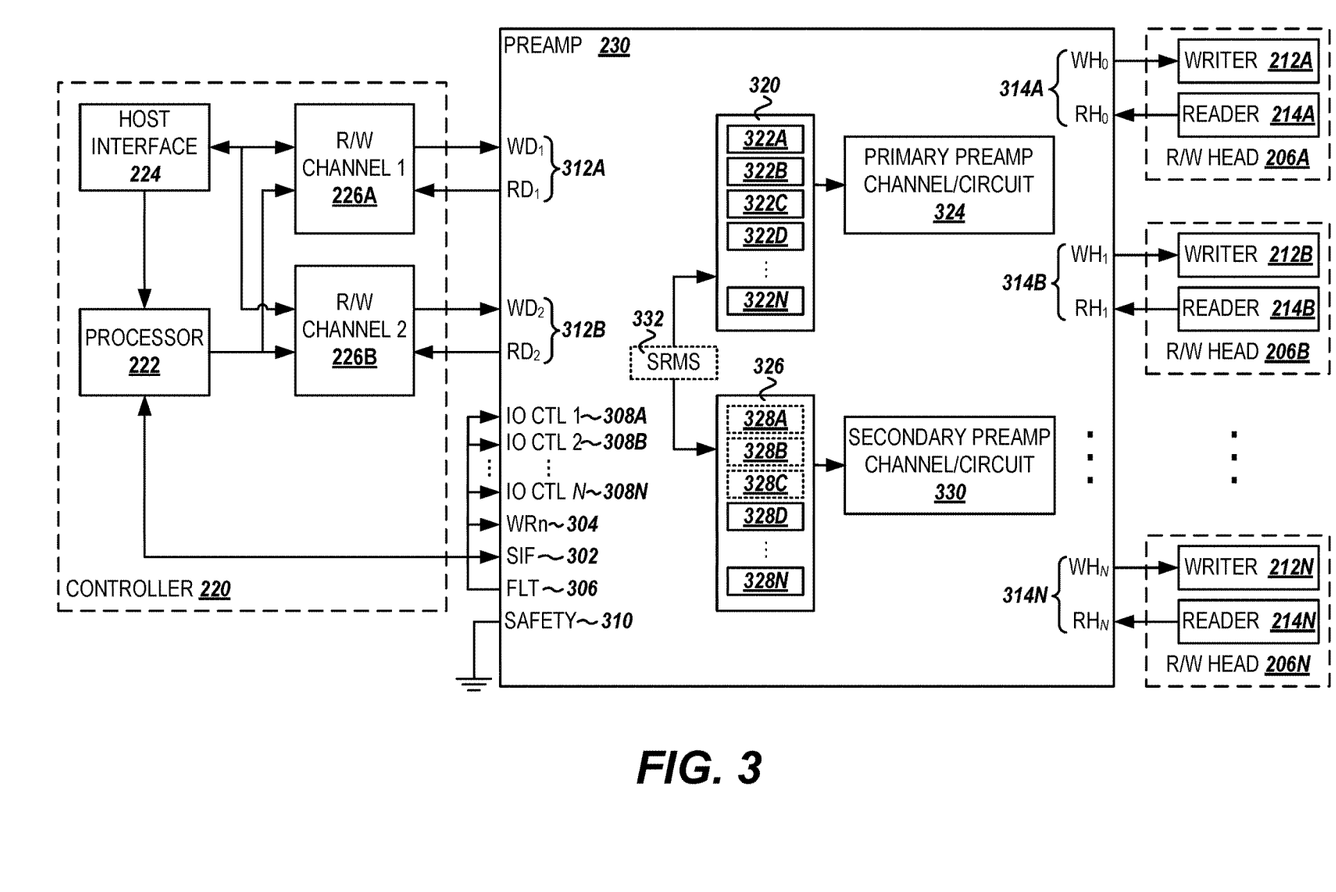
FIGS. 3 and 4 are block diagrams showing additional details of single-die preamps implementing multiple, virtual preamps for concurrent reading or writing to different heads/elements, according to embodiments described herein.

FIG. 3 shows details of a preamplifier 230 implemented according to the embodiments described herein. According the some embodiments, the processor 222 is connected to a number of control lines and interfaces of the preamplifier 230 in order to allow for control of preamp operation. As in a traditional preamplifier, the processor 222 may be connected to a serial interface (SIF) 302 of the preamplifier 230 for programming the preamp. The SIF 302 may allow the processor 222 to exchange data with the preamplifier 230, providing read/write access to configuration, control, and programming information, such as the register map(s) described below.

The processors 222 may be further connected to a number of other control lines of the preamplifier 230. For example, the processor 222 may contain one or more write enable lines that may be further connected to one or more write-enable lines, such as write enable line 304, or I/O control lines, such as I/O control lines 308A-308N (referred to herein generally as I/O control lines 308), of the preamplifier 230 to allow enabling of write operations to the read/write heads 206. The processor 222 may also be connected to a fault line 306 of the preamplifier 230 allowing the preamp to raise write faults or other events to the processor. The processor may be further connected to a number of I/O control lines, 308 that provide control of various functionality in the preamplifier 230. The functionality or effect of the I/O control lines 308 may be programmable in the preamplifier 230, for example. According to some embodiments, the preamplifier 230 may also include a safety bump line 310 or pin for enabling or disabling certain features in the preamp, as will be described below.

The preamplifier 230 is further connected to the read/write channel(s) 226 through one or more signal interfaces, such as signal interfaces 312A and 312B (referred to herein generally as signal interface 312), for transfer of reading and recording signals from/to the read/write heads 206. Each signal interface may comprise a write signal path and a read signal path. In some embodiments, if the controller 220 implements a single read/write channel 226, then the preamplifier 230 may only contain a single signal interface 312. In other embodiments, the preamplifier 230 may comprise an independent signal interface 312A and 312B connected to each read/write channel 226A and 226B implemented in the controller 220.

The preamplifier 230 is further connected to each read/write head 206A-206N in the storage device through a head interface, such as head interfaces 314A-314N (referred to herein generally as head interface 314) shown in the figure. Each head interface 314 allows shaped and conditioned recording signals from the write signal path of the signal interface(s) 312 to be sent to the writer element(s) 212A-212N of the associated head 206A-206N, while read signals from reader elements 214A-214N on the associated heads are fed back to the read signal path of a signal interface. The head interfaces 314 may further provide for control of other aspects and features of the read/write heads 206, such as controlling head heaters, reading sensor values, and the like. It will be appreciated that the preamplifier 230 may implement any number of head interfaces 314 depending on the maximum number of read/write heads 206 that may be installed in the storage device 200. For example, the preamplifier 230 may support 4, 8, or 16 heads. It will be further appreciated that various other signal paths, data interfaces, and connections between the preamplifier 230 and the controller 220, the read/write heads 206, and/or other components in the storage device 200 may exist beyond those shown in the figures and described herein.

The preamplifier 230 contains a primary register map 320 mapping a number of register 322A-322N (referred to herein generally as registers 322) maintained in the preamp that control the function of a primary preamp channel or circuit 324. The primary preamp channel/circuit 324 may comprise programmable-gain amplifiers ("PGA"), programmable filters, and the like that condition the read and recording signals traveling to and from the elements 212, 214 of the read/write heads 206 during read and write operations in the storage device 200 based on the values of the registers 322 in the primary register map 320. For example, the primary register map 320 may contain a head selection register (also referred to herein as "head selection bits") that specify which read/write head 206 and/or element 212, 214 in the storage device 200 is targeted by a current read or write operation. The processor 222 may use SIF commands to program the head selection register in the primary register map 320 prior to performing the operation. In addition, the processor 222 may use additional SIF commands to set the values of other registers 322 in the primary register map 320 specifying parameters for proper reading from or writing to the target read/write head 206 or element 212, 214, such as write current, heater power, MR bias current, or the like.

According to embodiments, the preamplifier 230 further contains a secondary register map 326 mapping registers 328A-328N containing values that controls the function of a secondary preamp channel or circuit 330. In some embodiments, the secondary register map 326 may comprise a same number of registers 328A-328N as the primary register map 320. Some of the registers mapped in the secondary register map 326, such as registers 328A-328C, may be mapped to the same corresponding registers 322A-322C in the primary register map 320, while others, such as registers 328D-328N, may contain distinct values which function independently from the corresponding registers 322D-322N in the primary register map. For example, registers containing values associated with servo copy modes of operation of the storage device 200 may not be duplicated between the primary register map 320 and secondary register map 326. Because of this, the secondary register map 326 may also be referred to as a "virtual" register map. In some embodiments, the preamplifier 230 may contain two or more virtual register maps that, in addition to the primary register map 320, allow for operation of three or more distinct preamp channel/circuits targeting three or more different read/write heads 206 or elements 212 concurrently.

In further embodiments, the preamplifier 230 includes a secondary register map selection ("SRMS") register 332, (SRMS). The value of the SRMS register 332 indicates which registry map, i.e. the primary register map 320 or a secondary (virtual) registry map 326 is accessed by SIF commands from the processor 222. For example, in a preamplifier 230 with a single secondary (virtual) register map 326, the SRMS register 332 may comprise one bit where a value of 0 indicates the primary register map 320 is selected for SIF writing or reading and a value of 1 indicates the secondary register map 326 is selected for SIF writing or reading. When the SRMS bit is set to 1, the contents of the primary register map 320 are not overwritten and are still valid for the head selected by the head selection register in the primary register map. Similarly, when the SRMS bit is cleared (=0), the contents of the secondary register map 326 are not overwritten and are still valid for the head selected by the head selection register in the secondary register map.

In a preamplifier 230 with two or more virtual register maps, the SRMS register 332 may comprise sufficient number of bits to address all register maps. According to some embodiments, setting the value of the SRMS register in any register map may set the register value in all register maps to the same value so that the processor 222 can set the SRMS register to the value necessary to address any target register map regardless of the current value.

According the some embodiments, the virtual preamp features of the preamplifier 230 may be enabled by setting bits in two, non-co-located registers, Virt_En0 and Virt_En1 (not shown), in the preamplifier. When the feature is enabled, the secondary (virtual) register map 326 may be accessed by the processor by setting the SRMS register 332. When the feature is disabled, any register values in the secondary register map 326 are ignored and the default register map is the primary register map 320. Thus the preamplifier 230 will operate as a single preamp with one register map.

In further embodiments, the preamplifier 230 may be configured such that the head selection registers of the primary register map 320 and the secondary (virtual) register map 326 cannot be set to the same value, i.e., may not be configured to address the same read/write head 206 or same element 212, 214 on the same head. If the primary register map 320 and the secondary register map 326 have matching head selection bits, only the primary register map is operational for the selected head/element combination and the virtual preamp features of the preamplifier 230 are disabled regardless of the setting of the SRMS register 332. The features may remain non-operational until the value of the head selection register in the secondary register map 326 is changed to indicate a head and element combination other than the one selected by the primary register map 320.

According to some embodiments, the write-enable line 304 (pin) controls writing for all preamp channels in the preamplifier 230. For example, when the write-enable line 304 is set high, the preamplifier 230 writes with both the primary preamp channel/circuit 324 and the secondary preamp channel/circuit 330 to the read/write heads 206 and/or writer elements 212 designated in the head selection registers of the primary register map 320 and secondary register map 326, respectively. Write current control, pulse shaping control, and the like may operate independently for each preamp channel/circuit 324, 330 and selected head/element combination based on the values of the registers 322, 328 set in the corresponding register map.

For example, the controller 220 can program the preamplifier 230 to use a recording signal from a single read/write channel 226A to write the same data to two different recording surfaces 204 on the disks 202 using different read/write heads 206A and 206B, with the recording signal independently shaped and conditioned based on specific requirements of the associated writer elements 212 set in the independent register values of the primary register map 320 and the secondary register map 326. Similarly, two different recording signals from two independent read/write channels 226A, 226B may be written to separate head/element combinations with different preamp channel/circuit configurations at the same time.

Figure 4:
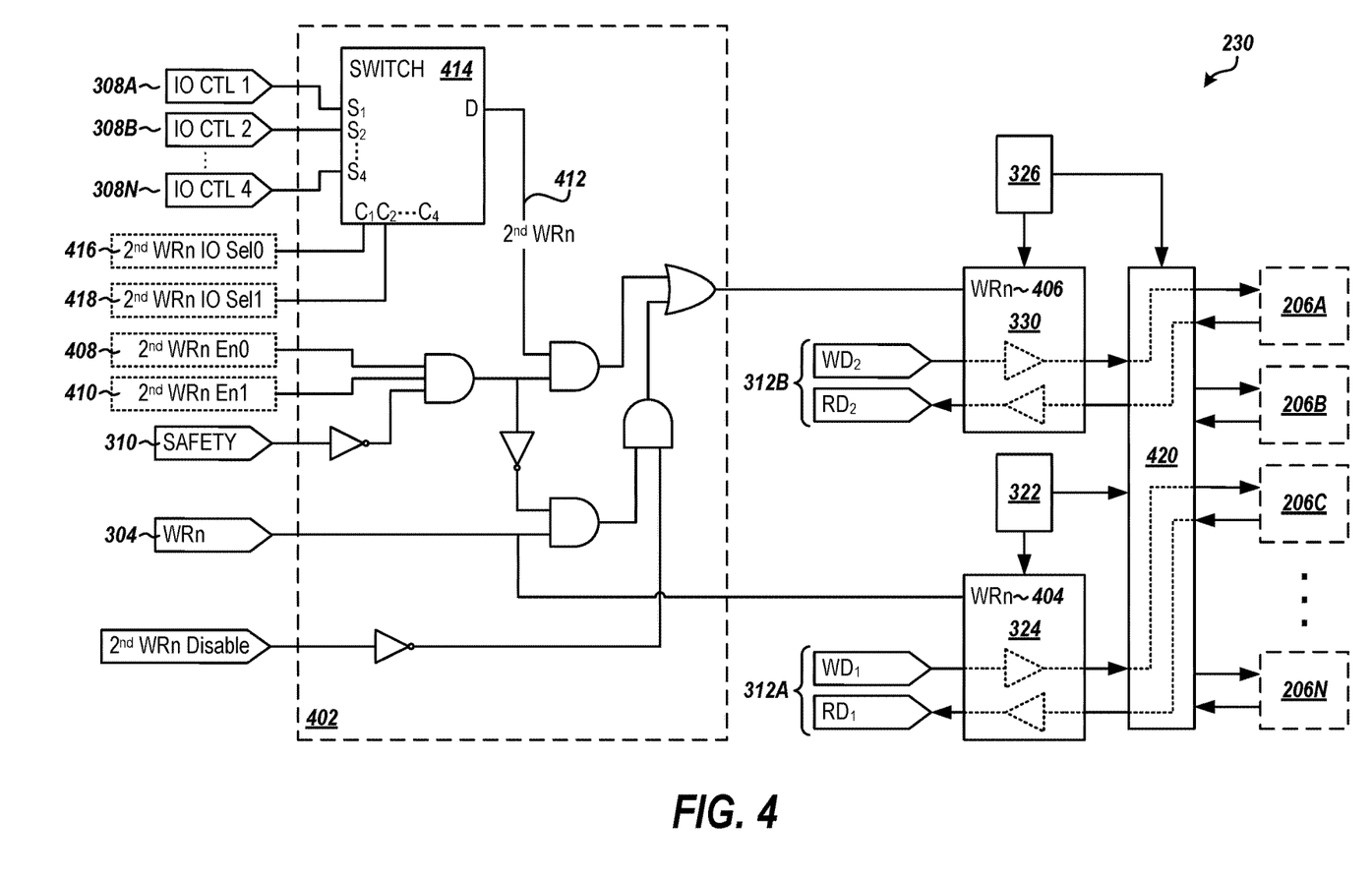

In further embodiments, the preamplifier 230 may implement a logic circuit 402 for providing independent write enable control lines 404 and 406 for each preamp channel/circuit 324, 330, as shown in FIG. 4. This allows the preamplifier 230 to support writing to one read/write head 206 in the storage device 200 while simultaneously reading from another read/write head. The preamplifier 230 may contain two separate bit registers, 2nd_WRn_En0 408 and 2nd_WRn_En1 410, that enable this feature. In some embodiments, the independent write-enable control feature is enabled only when both bits are set (=1). In further embodiments, the enablement of the independent write-enable control feature may further require the safety bump line 310 described above in regard to FIG. 3 to be grounded. Table 1 provides a logic table for enabling this feature, according to embodiments.

TABLE 1

Independent Write-Enable Control Feature Enablement

| Safety Bump | 2nd_WRn_En0 | 2nd_WRn_En1 | Independent WRn Feature Status |
|---|---|---|---|
| 1 | X | X | Disabled |
| 0 | 0 | 0 | Disabled |
| 0 | 0 | 1 | Disabled |
| 0 | 1 | 0 | Disabled |
| 0 | 1 | 1 | Enabled |

When the independent write-enable control feature is disabled, the write-enable line 304 of the preamplifier 230 controls writing for both the primary preamp channel/circuit 324 and the secondary preamp channel/circuit 330, as described above. When the feature is enabled, the preamplifier 230 may configure one of the I/O control lines 308A-308N from the processor 222 to operate as a secondary write-enable control line 412 for controlling writing to the secondary preamp channel/circuit 330. The write-enable line 304 continues to control writing to the primary preamp channel/circuit 324.

The selection of the I/O control line 308A-308N for the secondary write-enable control line 412 may be accomplished by a switching circuit 414 or component driven by the values of one or more bit registers, such as 2nd_WRn_IO_Sel0 416 and 2nd_WRn_IO_Sel1 418 shown in FIG. 4. Table 2 provides a logic table for selection of the I/O control line 308 or the secondary write-enable control line 412, according to embodiments. In further embodiments, the preamplifier 230 may include an additional register $2^{nd}$_WRn_Pol that selects the polarity of the secondary write-enable control line 412 independently of the configured polarity of the write-enable line 304 (pin) for the primary preamp channel/circuit.

TABLE 2

Secondary Write-enable line Selection

| 2nd_WRn_IO_Sel0 | 2nd_WRn_IO_Sel1 | I/O Control Line for $2^{nd}$ WRn |
|---|---|---|
| 0 | 0 | IO CTL 1 |
| 0 | 1 | IO CTL 2 |
| 1 | 0 | IO CTL 3 |
| 1 | 1 | IO CTL 4 |

In some embodiments, fault registers of both the primary register map 320 and the secondary register map drive the fault line 306 of the preamplifier 230. If either preamp channel/circuit detects a fault condition, the common fault line 306 is driven high to indicate a fault in the preamplifier 230 and/or read/write head(s) 206. According to further embodiments, the head selection registers in the primary register map 320 and the secondary (virtual) register maps 326 control the mux 420 of the preamplifier 230 to route the read and recording signals from the primary preamp channel/circuit 324 and the secondary preamp channel/circuit 330, respectively, to the selected read/write heads 206 and elements 212, 214.

Figure 5:
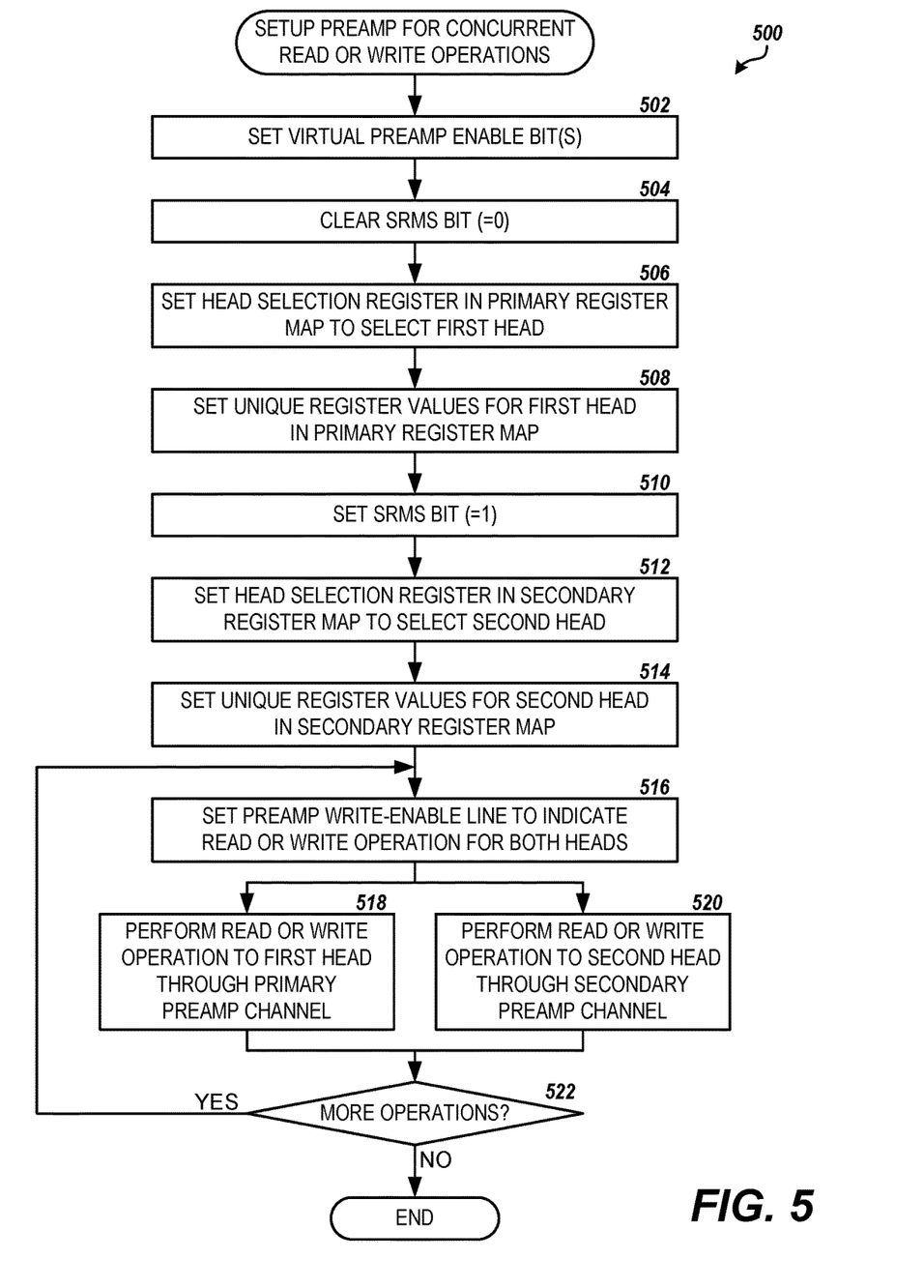
FIG. 5 is a flow diagram showing one method of setting up a single-die preamp described herein for concurrent read or write operations to separate head/elements, according to embodiments described herein.

FIG. 5 shows one routine 500 for programming the preamplifier 230 described herein for performing read and write operations targeting a first read/write head, such as read/write head 206C through the primary preamp channel/circuit 324 while concurrently performing read and write operations targeting a second read/write head, such as read/write head 206A through the secondary preamp channel/circuit 330, according to some embodiments. The routine 500 may be performed by the controller 220 of the storage device 200 when setting up the preamplifier 230 for concurrent read or write operations, for example. The routine 500 may be used with a preamplifier 230 that does not implement the independent write-enable control feature described above in regard to FIG. 4 or when the independent write-enable control feature is not enabled in the preamp.

The routine 500 includes step 502, where the controller 220 enables the virtual preamp feature of the preamplifier 230. For example, the processor 222 may issue SIF commands to the preamplifier 230 that set the bits in the two, non-co-located registers Virt_En0 and Virt_En1 that allow the secondary (virtual) register map 326 to be accessed by the processor in addition to the primary register map 320. From step 502, the routine 500 proceeds to step 504, where the controller 220 sets the SRMS register 332 of the preamplifier 230 to indicate access to the primary register map 320 is desired. For example, the processor 222 may issue a SIF command to clear the SRMS bit (=0).

The routine 500 proceeds from step 504 to step 506, where the controller sets the head selection register value in the primary register map 320 to indicate the first read/write head 206C and/or a specific element 212, 214 on the head to which to route the signals from the primary preamp channel/circuit 324. Next, at step 508, the controller programs the primary preamp channel/circuit 324 for reading or writing to the selected head/element combination. For example, the processor 222 may issue SIF commands to the preamplifier 230 that sets registers 322 of the primary register map 320 to values specific to the first read/write head 206C. The register values may include reading and writing parameters, such as write current, heater power, MR bias current, and the like determined for the read/write head 206C or elements 212, 214 thereon optimized for the head/element combination during a configuration or optimization process, for example. These reading and parameter values may retrieved from the memory 232 by the processor 222 and programmed into the primary preamp channel/circuit by modifying the associated registers 322 in the primary register map 320, for example.

From step 508, the routine 500 proceeds to step 510, where the controller 220 sets the SRMS register 332 of the preamplifier 230 to indicate access to the secondary (virtual) register map 326 is desired. For example, the processor 222 may issue a SIF command to set the SRMS bit (=1). The routine 500 proceeds from step 510 to step 512, where the controller sets the head selection register value in the secondary register map 326 to indicate the second read/write head 206A and/or a specific element 212, 214 on the head to which to route the signals from the secondary preamp channel/circuit 330. Next, at step 514, the controller programs the secondary preamp channel/circuit 330 for reading or writing to the selected head/element combination by setting the registers 328 of the secondary register map 326 to values specific to the second read/write head 206A.

At step 516, the controller 220 sets the write-enable line 304 of the preamplifier 230 to indicate whether a write operation or read operation is to be performed for both the first read/write head 206C and the second read/write head 206A. For example, based on the setting of the value of a register 322 in the primary register map 320 controlling the polarity of the write-enable line 304, the processor 222 may set the write-enable line 304 low to indicate a read operation is to be performed for the first and second read/write heads 203C and 203A or set the write-enable line high to indicate a write operation is to be performed for the heads. According to embodiments, the setting of the write-enable line 304 will affect both the primary preamp channel/circuit 324 and the secondary preamp channel/circuit 330.

From step 516, the routine 500 proceeds to step 518, where the controller performs the indicated read or write operation to the first read/write head 206C through the primary preamp channel/circuit 324 as configured by the primary register map 320. At the same time, the controller performs the indicated read or write operation to the second read/write head 206A through the secondary preamp channel/circuit 330 as configured by the secondary (virtual) register map 326, as shown at step 520. After performing the operations, the routine 500 proceeds to step 522 where the controller 220 determines whether additional read or write operations to both the first and second read/write heads 206C and 206A are to be performed. If more operations targeting the currently selected head/element combinations exist, then the routine 500 returns to step 516, where the controller sets the write-enable line 304 for the next operation. If no more operations targeting the configured head/element combinations exist, the routine 500 ends.

Figure 6A:
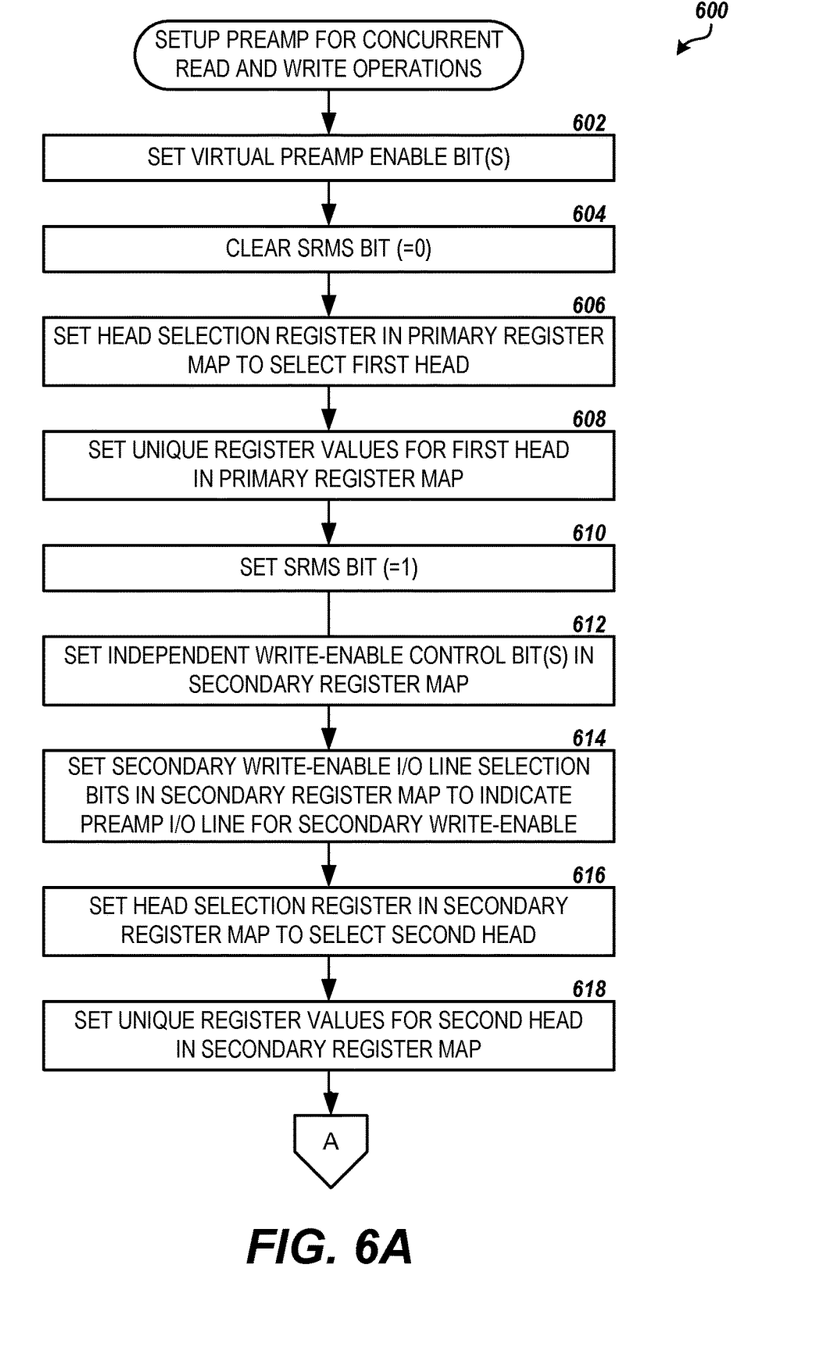
FIGS. 6A and 6B are a flow diagram showing another method of setting up a single-die preamp described herein for concurrent read or write operations to separate head/elements, according to embodiments described herein.
Figure 6B:
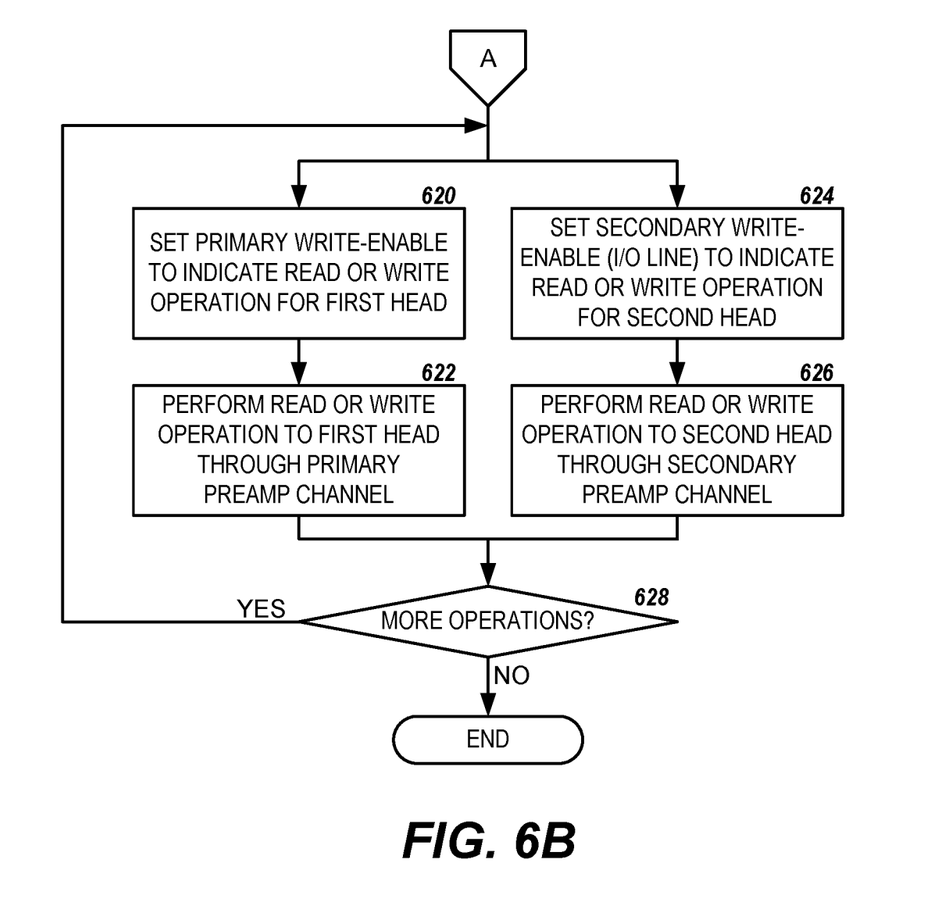

FIGS. 6A and 6B show another routine 600 for programming the preamplifier 230 described herein for performing read and write operations targeting the first read/write head 206C through the primary preamp channel/circuit 324 while concurrently performing read and write operations targeting the second read/write head 206A through the secondary preamp channel/circuit 330, according to further embodiments. The routine 600 may be performed by the controller 220 of the storage device 200 when setting up the preamplifier 230 for concurrent read and write operations, for example. The routine 600 may be used with a preamplifier 230 that implements the independent write-enable control feature, as described above.

The routine 600 includes step 602 as shown in FIG. 6A, where the controller 220 enables the virtual preamp feature of the preamplifier 230. For example, the processor 222 may issue SIF commands to the preamplifier 230 that set the bits in the two, non-co-located registers Virt_En0 and Virt_En1 that allow the secondary (virtual) register map 326 to be accessed by the processor in addition to the primary register map 320. From step 602, the routine 600 proceeds to step 604, where the controller 220 sets the SRMS register 332 of the preamplifier 230 to indicate access to the primary register map 320 is desired. For example, the processor 222 may issue a SIF command to clear the SRMS bit (=0).

The routine 600 proceeds from step 604 to step 606, where the controller sets the head selection register value in the primary register map 320 to indicate the first read/write head 206C and/or a specific element 212, 214 on the head to which to route the signals from the primary preamp channel/circuit 324. Next, at step 608, the controller programs the primary preamp channel/circuit 324 for reading or writing to the selected head/element combination. For example, the processor 222 may issue SIF commands to the preamplifier 230 that sets registers 322 of the primary register map 320 to values specific to the first read/write head 206C.

From step 608, the routine 600 proceeds to step 610, where the controller 220 sets the SRMS register 332 of the preamplifier 230 to indicate access to the secondary (virtual) register map 326 is desired. For example, the processor 222 may issue a SIF command to set the SRMS bit (=1). The routine 600 proceeds from step 610 to step 612, where the controller 220 enables the independent write-enable control feature in the preamplifier 230. For example, the processor 222 may issue SIF commands to set the separate bit registers 2nd_WRn_En0 408 and 2nd_WRn_En1 410 high (=1). Next, at step 614, the controller 220 configures the I/O control line 308 to be utilized as the secondary write-enable control line 412. For example, the processor 222 may issue SIF commands to set the values of the 2nd_WRn_IO_Sel0 416 and 2nd_WRn_IO_Sel1 418 bit registers to indicate the desired I/O control line 308A-308N, as described above in regard to FIG. 4.

The routine 600 proceeds from step 614 to step 616, where the controller sets the head selection register value in the secondary register map 326 to indicate the second read/write head 206A and/or a specific element 212, 214 on the head to which to route the signals from the secondary preamp channel/circuit 330. Next, at step 618, the controller programs the secondary preamp channel/circuit 330 for reading or writing to the selected head/element combination by setting the registers 328 of the secondary register map 326 to values specific to the second read/write head 206A.

From step 618, the routine 600 proceeds to step 620 shown in FIG. 6B, where the controller 220 sets the write-enable line 304 of the preamplifier 230 to indicate whether a write operation or read operation is to be performed for the first read/write head 206C. For example, based on the setting of the value of a register 322 in the primary register map 320 controlling the polarity of the write-enable line 304, the processor 222 may set the write-enable line 304 low to indicate a read operation is to be performed for the first read/write head 203C or set the write-enable line high to indicate a write operation is to be performed for the head. Next, at step 622, the controller performs the indicated read or write operation to the first read/write head 206C through the primary preamp channel/circuit 324 as configured by the primary register map 320.

At the same time, the controller sets the secondary write-enable control line 412 to indicate whether a write operation or read operation is to be performed for the second read/write head 206A. For example, the processor 222 may set the I/O control line 308 configured to operate as the secondary write-enable control line 412 in step 614 high or low depending on the setting of the $2^{nd}$_WRn_Pol register value in the secondary register map 326 to indicate the desired operation. Next, at step 626, the controller performs the indicated read or write operation to the second read/write head 206A through the secondary preamp channel/circuit 330 as configured by the secondary (virtual) register map 326.

After performing the operations, the routine 600 proceeds to step 628 where the controller 220 determines whether additional read and write operations to both the first and second read/write heads 206C and 206A are to be performed. If more operations targeting the currently selected head/element combinations exist, then the routine 600 returns to steps 620 and 624, where the controller 220 sets the write-enable line 304 and secondary write-enable control line 412 for the next concurrent operations. If no more operations targeting the configured head/element combinations exist, the routine 600 ends.

Based on the foregoing, it will be appreciated that methods and apparatuses for allowing a single-die preamp to act as two or more virtual preamps for reading or writing data through multiple heads or elements concurrently are presented herein. It will be appreciated that the structure and/or organization of the components of the preamplifier 230 and logic circuit 402 may be different from that illustrated in FIGS. 3 and 4 and described herein. For example, the primary preamp channel/circuit 324, the secondary preamp channel/circuit 330, the logic circuit 402, and the mux 420, and/or other components and circuitry described may be implemented in digital logic, analog circuits, software, or any combination thereof, and may be integrated within a common integrated circuit package or the components may be distributed among multiple integrated circuit packages. Similarly, the illustrated connection pathways are provided for purposes of illustration and not of limitation, and some components and/or interconnections may be omitted for purposes of clarity. It will be further appreciated that the preamplifier 230 described herein may not include all of the components shown in the figures, or may include other components that are not explicitly shown in the figures.

While the preamplifier 230 is shown in the figures and described herein as including a single secondary register map 326 supporting a secondary preamp channel/circuit 330, it will be appreciated that the preamplifier may contain any number of secondary (virtual) register maps supporting corresponding secondary preamp channels, allowing the preamplifier to support reading from and/or writing to three or more head/element combinations concurrently. In addition, while the embodiments presented herein are described in relation to an HDD device, it will be further appreciated that the methods and apparatuses described herein may be utilized in any storage device containing implementing a preamplifier 230 in the recording channel, including a solid-state hybrid drive ("SSHD") device, an optical disk drive device, and the like.

The logical steps, functions, or operations described herein as part of a method, process or routine may be implemented (1) as interconnected digital circuits or components and/or (2) as a sequence of processor-implemented acts, software modules, or portions of code running on a controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method comprising steps of:
   setting a selection register of a preamplifier in a storage device to enable access to a primary register map of the preamplifier;
   setting values of registers in the primary register map to program a primary preamp channel for performing read or write operations to a first reader or writer element in the storage device;
   setting the selection register to enable access to a secondary register map of the preamplifier;
   setting values of registers in the secondary register map to program a secondary preamp channel for performing read or write operations to a second reader or writer element in the storage device; and
   performing the read or write operations to the first reader or writer element through the primary preamp channel while concurrently performing the read or write operations to the second reader or writer element through the second preamp channel.

2. The method of claim 1, wherein the secondary register map comprises a same number of registers as the primary register map and wherein only a subset of registers in the secondary register may hold distinct values from the corresponding registers in the primary register map.

3. The method of claim 1, wherein the preamplifier comprises a plurality of secondary preamp channels, each associated with one of a plurality of secondary register maps.

4. The method of claim 1, wherein setting the selection register to enable access to the primary register map or secondary register map comprises issuing a command to a serial interface ("SIF") of the preamplifier.

5. The method of claim 1, wherein the preamplifier comprises independent write-enable controls for the primary preamp channel and secondary preamp channel, the method further comprising:
setting the write-enable control associated with the primary preamp channel to indicate a write operation; and
setting the write-enable control associated with the secondary preamp channel to indicate a read operation.

6. The method of claim 5, wherein the preamplifier further comprises a hardware control line associated with enabling the independent write-enable controls.

7. The method of claim 5, wherein the write-enable control associated with the secondary preamp channel comprises a first I/O control line selected from a plurality of I/O control lines of the preamplifier, the first I/O control line selected by setting one or more register values in the secondary register map.

8. The method of claim 1, wherein the preamplifier comprises controls to enable the secondary register map, the method further comprising:
setting at least one register value associated with enabling the secondary register map to indicate enabled.

9. The method of claim 1, wherein the storage device comprises a hard disk drive ("HDD") device.

10. A preamplifier apparatus for a storage device, the preamplifier apparatus connected to a plurality of read/write heads of the storage device and comprising a primary register map and at least one secondary register map, the preamplifier apparatus configured to control read or write operations of a first of the plurality of read/write heads based on a contents of the primary register map while concurrently controlling read or write operations of a second of the plurality of read/write heads based on the contents of the at least one secondary register map.

11. The preamplifier apparatus of claim 10, wherein the secondary register map comprises a same number of registers as the primary register map and wherein only a subset of registers in the secondary register may hold distinct values from the corresponding registers in the primary register map.

12. The preamplifier apparatus of claim 10, wherein access to the at least one secondary register map is enabled by setting a secondary register map selection bit in the primary register map.

13. The preamplifier apparatus of claim 12, wherein setting the secondary register map selection bit comprises issuing a command to a serial interface ("SIF") of the preamplifier apparatus.

14. The preamplifier apparatus of claim 10, further comprising a logic circuit providing independent write-enable controls associated with the primary register map and the at least one secondary register map.

15. The preamplifier apparatus of claim 14, wherein the preamplifier apparatus is implemented on a single-die.

16. The preamplifier apparatus of claim 14, wherein the logic circuit comprises a switch configured to select a first I/O control line from a plurality of I/O control lines of the preamplifier apparatus for the write-enable control associated with the at least one secondary register map based on values of one or more register values in the secondary register map.

17. A system comprising:
a single-die preamplifier in a hard-disk ("HDD") device, the preamplifier containing a plurality of preamp channels and independent virtual controls; and
a processor in a controller of the HDD, the processor connected to the preamplifier by a serial interface and configured to send commands over the serial interface to enable a virtual preamp feature of the preamplifier;
set a secondary register map selection register of the preamplifier to address a primary register map of the preamplifier;
set a head selection register of the primary register map to select a first read/write head of the HDD device for read or write operations through a primary preamp channel of the preamplifier;
set registers in the primary register map to program the primary preamp channel for the first read/write head;
set the secondary register map selection register to address a secondary register map of the preamplifier;
set a head selection register of the secondary register map to select a second read/write head of the HDD device for read or write operations through a secondary preamp channel of the preamplifier;
set registers in the secondary register map to program the secondary preamp channel for the second read/write head; and
perform read or write operations to the first read/write head through the primary preamp channel while concurrently performing read or write operations to the second read/write head through the second preamp channel.

18. The system of claim 17, wherein the preamplifier comprises a plurality of secondary preamp channels, each associated with one of a plurality of secondary register maps.

19. The system of claim 17, wherein the virtual preamp feature of the preamplifier is disabled if the head selection register of the primary register map and the head selection register of the secondary register map are set to select a same read/write head and reader element.

20. The system of claim 17, wherein the preamplifier comprises independent write-enable controls for the primary preamp channel and secondary preamp channel, the processor further configured to:
set a write-enable control associated with the primary preamp channel to indicate a write operation; and
set a write-enable control associated with the secondary preamp channel to indicate a read operation.

* * * * *